(12) United States Patent
Ichiki

(10) Patent No.: US 7,655,266 B1
(45) Date of Patent: Feb. 2, 2010

(54) METHOD FOR MAKING BISCUITS

(75) Inventor: Yoshitaka Ichiki, Takatsuki (JP)

(73) Assignee: Meiji Seika Kaisha, Ltd., Tokyo (JP)

( * ) Notice: Subject to any disclaimer, the term of this patent is extended or adjusted under 35 U.S.C. 154(b) by 895 days.

(21) Appl. No.: 11/046,268

(22) Filed: Jan. 28, 2005

Related U.S. Application Data

(60) Provisional application No. 60/562,354, filed on Apr. 15, 2004.

(51) Int. Cl.
*A21D 6/00* (2006.01)

(52) U.S. Cl. .................. 426/496; 426/512; 426/518; 426/519; 426/389

(58) Field of Classification Search .............. 222/216, 222/220; 425/645; 426/518, 512, 596, 519, 426/389, 523, 496
See application file for complete search history.

(56) References Cited

U.S. PATENT DOCUMENTS

| | | | | |
|---|---|---|---|---|
| 2,080,162 A | * | 5/1937 | Bradley et al. ................ 426/27 |
| 2,584,444 A | * | 2/1952 | Grueneberg ................ 198/530 |
| 3,158,486 A | * | 11/1964 | Morck et al. ................ 426/250 |
| 4,517,212 A | * | 5/1985 | Campbell ................... 426/496 |
| 4,936,200 A | | 6/1990 | Buhler et al. ................. 99/353 |
| 4,975,039 A | | 12/1990 | Dare et al. ................. 425/238 |
| 5,510,135 A | | 4/1996 | Galder ....................... 426/512 |
| 5,783,126 A | * | 7/1998 | Andersen et al. ............ 264/102 |
| 5,846,584 A | * | 12/1998 | Capodieci ................... 426/238 |
| 5,863,583 A | | 1/1999 | Altschul ..................... 426/302 |
| 6,132,199 A | * | 10/2000 | Chierici et al. .............. 425/233 |
| 2002/0094366 A1 | * | 7/2002 | Kershman et al. ........... 426/505 |
| 2003/0041743 A1 | | 3/2003 | Capodieci .................... 99/353 |

FOREIGN PATENT DOCUMENTS

| JP | 03-151865 | 6/1991 |
|---|---|---|
| JP | 2003-235457 | 8/2003 |

OTHER PUBLICATIONS

Naigai Nitto America Inc. Combined Transport Bill of Lading dated Dec. 29, 2001.
Laguna Cookie Company Invoice dated Jan. 11, 2002.
Laguna Cookie Company Packing List dated Jan. 8, 2002.
Laguna Cookie Company Packing List dated Jan. 9, 2002.
Laguna Cookie Company Packing List dated Jan. 11, 2002.
Invoice dated Jan. 11, 2002.

\* cited by examiner

*Primary Examiner*—Drew E Becker
*Assistant Examiner*—Preston Smith
(74) *Attorney, Agent, or Firm*—Barley Snyder LLC

(57) ABSTRACT

A method for making biscuits wherein a dough mixture is dispensed into an agitator. The dough mixture is agitated as it is being dispensed into cavities of a die. The dough mixture is compressed into the cavities of the die by a compression device. The dough mixture is ejected from the cavities of the die by pushing the dough mixture from a top surface of the die out of a bottom surface of the die and onto an apron with an ejection mechanism.

42 Claims, 5 Drawing Sheets

METHOD FOR MAKING BISCUITS

CROSS-REFERENCE TO RELATED APPLICATION

This reference claims the benefit of U.S. Provisional Application Ser. No. 60/562,354, filed Apr. 15, 2004.

FIELD OF THE INVENTION

The invention relates to a method for making food products and, more particularly, to a method for making biscuits.

BACKGROUND OF THE INVENTION

A biscuit, such as a food bar, snack bar, or digestive bar, is commonly produced by continuously feeding a dough mixture into cavities of a continually rotating cylindrical die at a pre-determined speed. As the die rotates, the die presses the dough mixture onto an apron. The dough mixture is then baked and cooled to form the biscuit.

A biscuit produced by this method, however, has several drawbacks. For example, the biscuit can fall apart easily and typically does not have a uniform shape and/or a uniform consistency. Additionally, the process can not use a loose mix of ingredients to form the biscuits.

SUMMARY OF THE INVENTION

It is therefore an object of the invention to provide a method for making a biscuit wherein the biscuit is resistant to crumbling and has a uniform shape and consistency.

This and other objects are achieved by a method for making biscuits wherein a dough mixture is dispensed onto a grid of an agitator. The grid is agitated to dispense the dough mixture through through-holes in the grid into cavities of a die. The dough mixture is compressed into the cavities of the die by a compression device.

This and other objects are further achieved by a method for making biscuits wherein a dough mixture is dispensed into an agitator. The dough mixture is agitated as it is being dispensed into cavities of a die. The dough mixture is compressed into the cavities of the die by a compression device. The dough mixture is ejected from the cavities of the die by pushing the dough mixture from a top surface of the die out of a bottom surface of the die onto an apron.

This and other objects are still further achieved by a method for making biscuits wherein a dough mixture is dispensed through a grid and into cavities of a die. The dough mixture is compressed in the cavities of the die with a compression device. The dough mixture is ejected from the cavities of the die by pushing the dough mixture from a top surface of the die out of a bottom surface of the die.

DETAILED DESCRIPTION OF THE INVENTION

Figure 1:
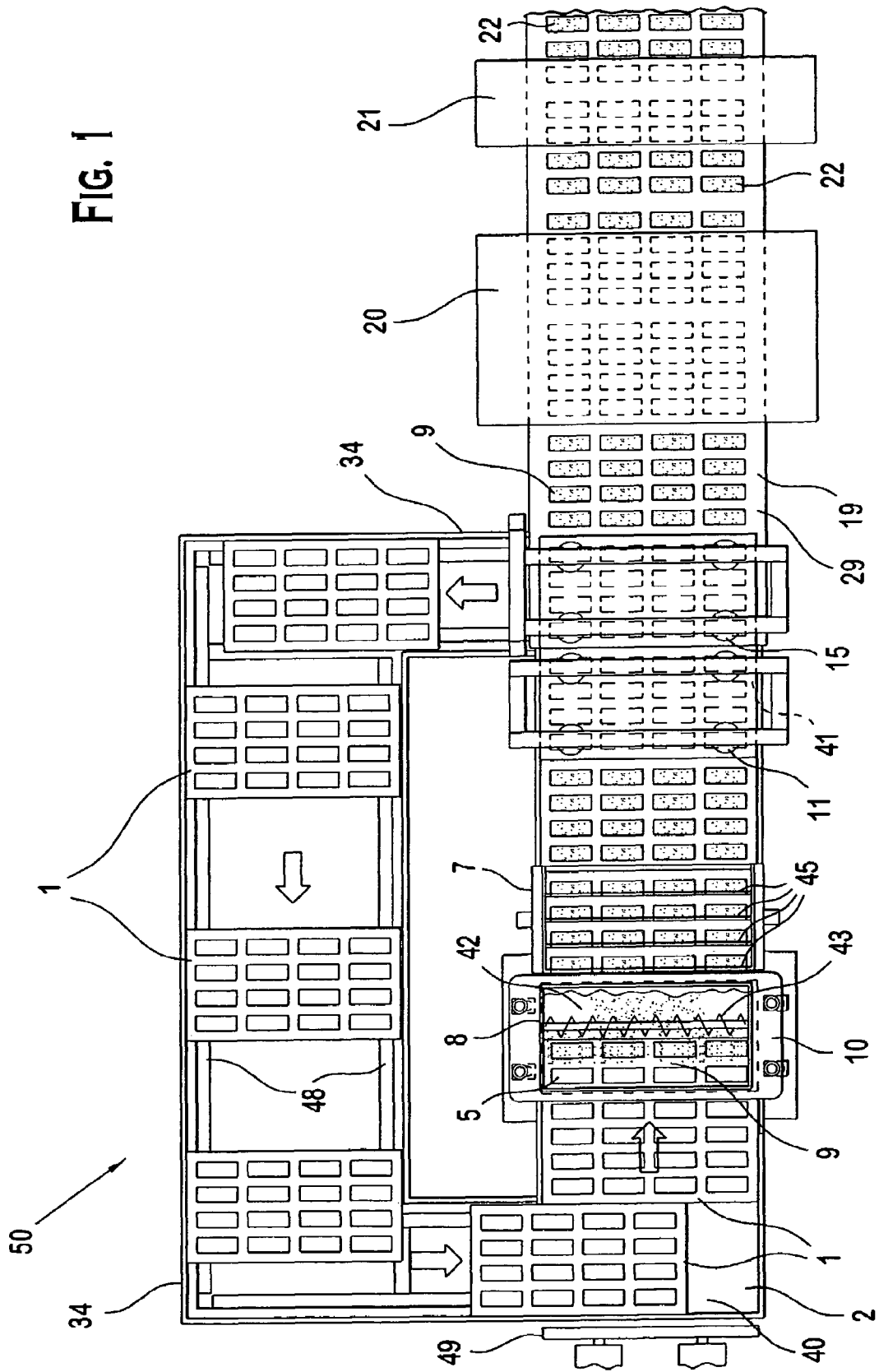
FIG. 1 is a schematic view of a system for making biscuits according to a method of the present invention.

FIG. 1 shows a system 50 for making biscuits 22 according to a method of the present invention. The term "biscuit" as used herein refers to a food product such as a food bar, snack bar, or digestive bar. As shown in FIG. 1, the system 50 and method generally includes a die 1 that is conveyed on a railing system 34 by a belt 48 onto a first end 40 of a die backing plate 2. The die 1 is advanced adjacent to the die backing plate 2 by a positioning mechanism 49 to a dispensing device 8. The dispensing device 8 dispenses a dough mixture 9 into the cavities 5 of the die 1 via an agitator 10. Once the cavities 5 are filled, the die 1 is conveyed to a leveling device 7 that levels the dough mixture 9 and removes any excess of the dough mixture 9 from the die 1. The die 1 is next conveyed to a compression device 11. The compression device 11 compresses the dough mixture 9 in the cavities 5. The die 1 is then conveyed from a second end 41 of the die backing plate 2 to an ejection mechanism 15. The ejection mechanism 15 ejects the compressed dough mixture 9 from the cavities 5 onto an apron 29 of a conveyor 19. The conveyor 19 conveys the compressed dough mixture 9 through a baking device 20. The baked dough mixture 9 forms a biscuit 22. The biscuit 22 is then cooled by a cooling device 21 and packaged for shipment.

Figure 2:
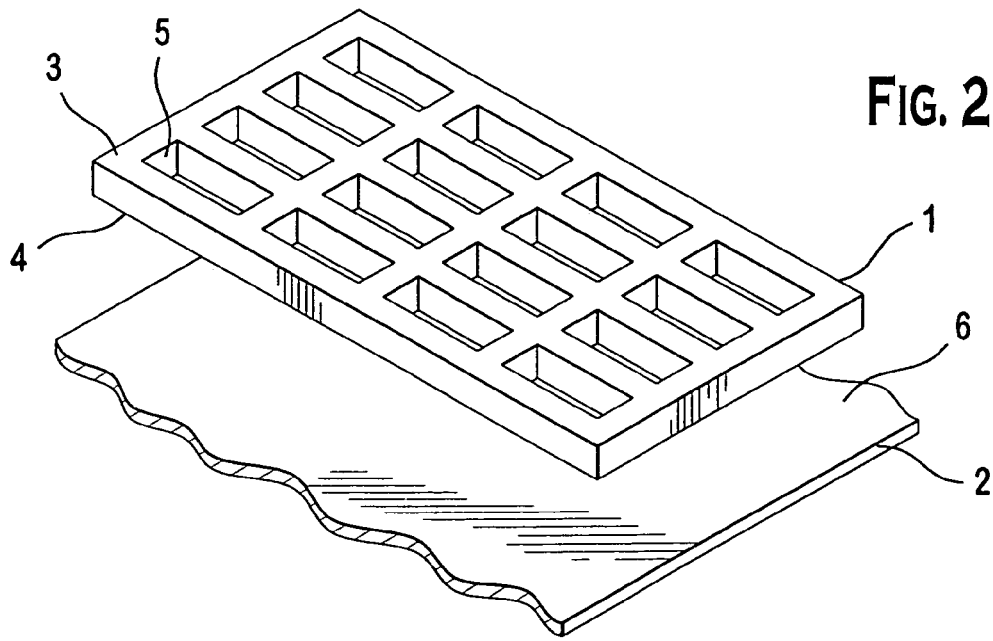
FIG. 2 is an exploded schematic view of a die and a die backing plate

The individual components of the system 50 will now be described in greater detail with reference to FIGS. 1 through 8. As shown in FIG. 2, the die 1 is a substantially elongated plate having a plurality of cavities 5. The cavities 5 extend from a top surface 3 of the die 1 to a bottom surface 4 of the die 1. The cavities 5 are formed to correspond to the desired shape and size of the biscuit 22 to be produced. For example, in the illustrated embodiment, the cavities 5 are substantially rectangular in configuration and are approximately 4.0 inches long, 0.5 inches high, and 1.5 inches wide.

As shown in FIGS. 1 and 2, the die backing plate 2 is an essentially elongated plate that extends through various stages of the system 50 from the first end 40 to the second end 41. The die backing plate 2 has a die receiving surface 6 that is substantially planar and that is formed to extend substantially parallel to the bottom surface 4 of the die 1. The die backing plate 2 is formed such that the die 1 receiving surface 6 forms a bottom surface for the cavities 5 when the bottom surface 4 of the die 1 is conveyed adjacent thereto. Although the die backing plate 2 is illustrated as extending though various stages of the system 50, the die backing plate 2 could alternatively be formed as a single plate that is positioned adjacent to the bottom surface 4 of the die 1 and is conveyed simultaneously therewith through various stages of the system 50.

As shown in FIG. 1, adjacent to the die backing plate 2 is a positioning mechanism 49. The positioning mechanism 49 may be any known positioning mechanism that advances the die 1 along the die backing plate 2.

Figure 3:
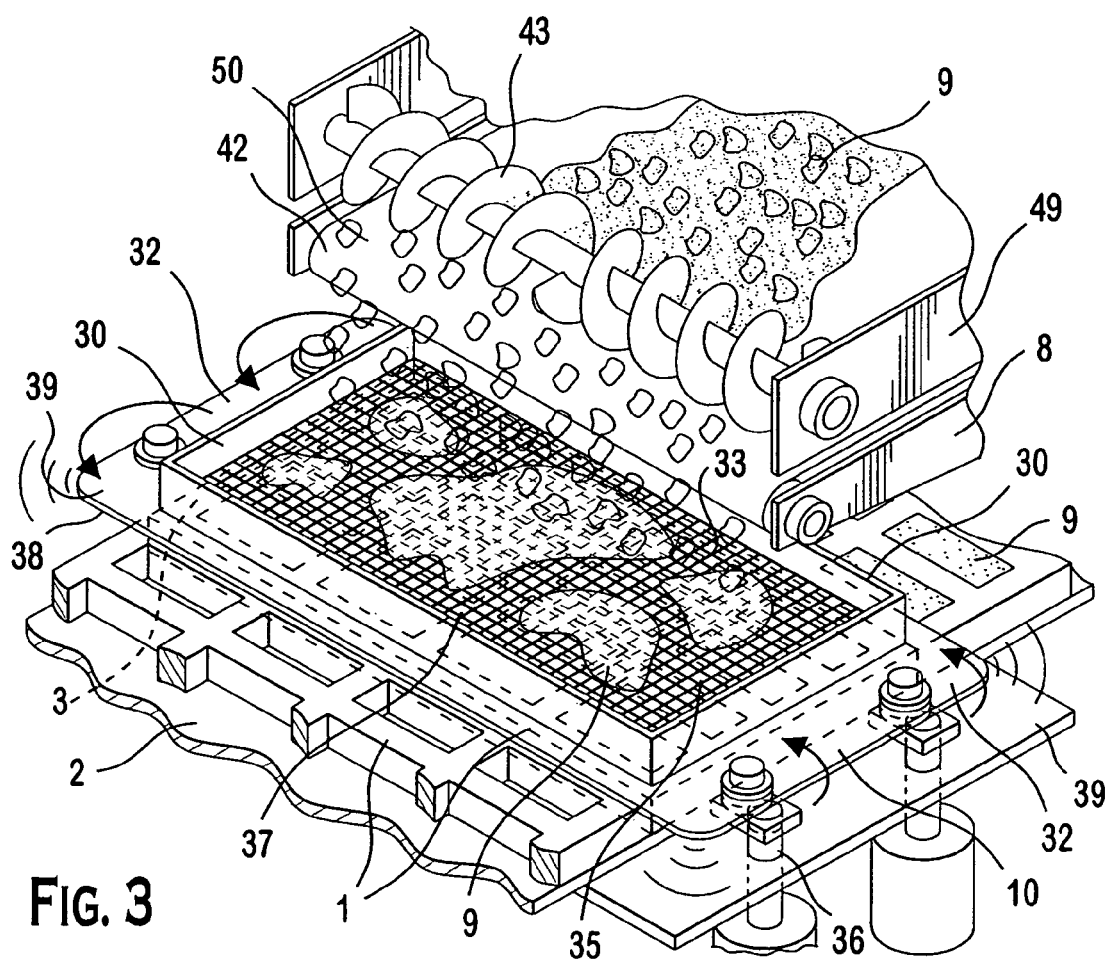
FIG. 3 is a schematic view of a dough mixture being dispersed into the die.

As shown in FIG. 3, the dispensing device 8 includes a hopper 49 having a dough conveyor 42 and a helical screw 43. The dough conveyor 42 may be any known conveying device capable of conveying the dough mixture 9. The helical screw 43 is arranged at an open side 50 of the hopper 49 and adjacent to the dough conveyor 42. The dispensing device 8 has an electronic device (not shown) linked to the dough conveyor 42 to control the rate of advancement of the dough conveyor 42. Alternatively, the dispensing device 8 may be any known dispensing device that is capable of holding and dispensing the dough mixture 9.

As shown in FIG. 3, the dough mixture 9 is any moist uncooked mixture comprising a loose mix of ingredients. Alternatively, the dough mixture 9 may be any cooked mixture comprising a loose mix of ingredients. The dough mixture 9 has a consistency that enables the dough mixture 9 to easily descend from a position of higher elevation to a position of lower elevation to facilitate dispensing of the dough mixture 9 from the dispensing device 8 into the agitator 10. For example, the dough mixture 9 may include a mixture of nuts, sugars, salts, starches, flour, and flavorings or any other suitable ingredients corresponding to the desired taste and/or appearance of the biscuit 22 to be produced.

As shown in FIG. 3, the agitator 10 includes a base 32. The base 32 has a bottom face 38 formed to extend substantially parallel to the top surface 3 of the die 1. The base 32 has an opening 35 provided with a grid 33. The opening 35 and the corresponding grid 33 are of a size and shape such that the grid 33 covers substantially all of the cavities 5 of the die 1 when the die 1 is positioned adjacent to the bottom face 38 of the base 32. The grid 33 has a plurality of through-holes 37 and is aligned substantially underneath the dispensing device 8. The through-holes 37 are of a size and shape such that the dough mixture 9 is uniformly distributed into the cavities 5 of the die 1 when the base 32 is agitated. Side walls 30 enclose the opening 35 and extend upward from the base 32 toward the dispensing device 8. The side walls 30 are formed such that the side walls 30 contain the dough mixture 9 during agitation of the base 32. The agitator 10 has a level sensor (not shown) that monitors the amount of the dough mixture 9 in the agitator 10.

As shown in FIG. 3, an agitating mechanism 36 is attached to ends 39 of the base 32. The agitating mechanism 36 both mounts the base 32 above the die backing plate 2 and agitates the base 32. The base 32 is mounted such that the top surface 3 of the die 1 is positioned adjacent to and almost in contact with the bottom face 38 of the base 32 when the bottom surface 4 of the die 1 is positioned on the die backing plate 2. The agitating mechanism 36 is such that it agitates the base 32 in a substantially circular motion in a plane parallel to the top surface 3 of the die 1 fast enough and long enough to distribute the dough mixture 9 though the through-holes 37 of the grid 33 and into the cavities 5 of the die 1. The grid 33 may be agitated such that it alternates between a clockwise and counter-clockwise direction. A standard amount of time for agitation would be, for example, approximately 10 seconds or less per die 1. Alternatively, the agitating mechanism 36 may be any known agitating mechanism that is capable of agitating the dough mixture 9 into the cavities 5 of the die 1.

Figure 4:
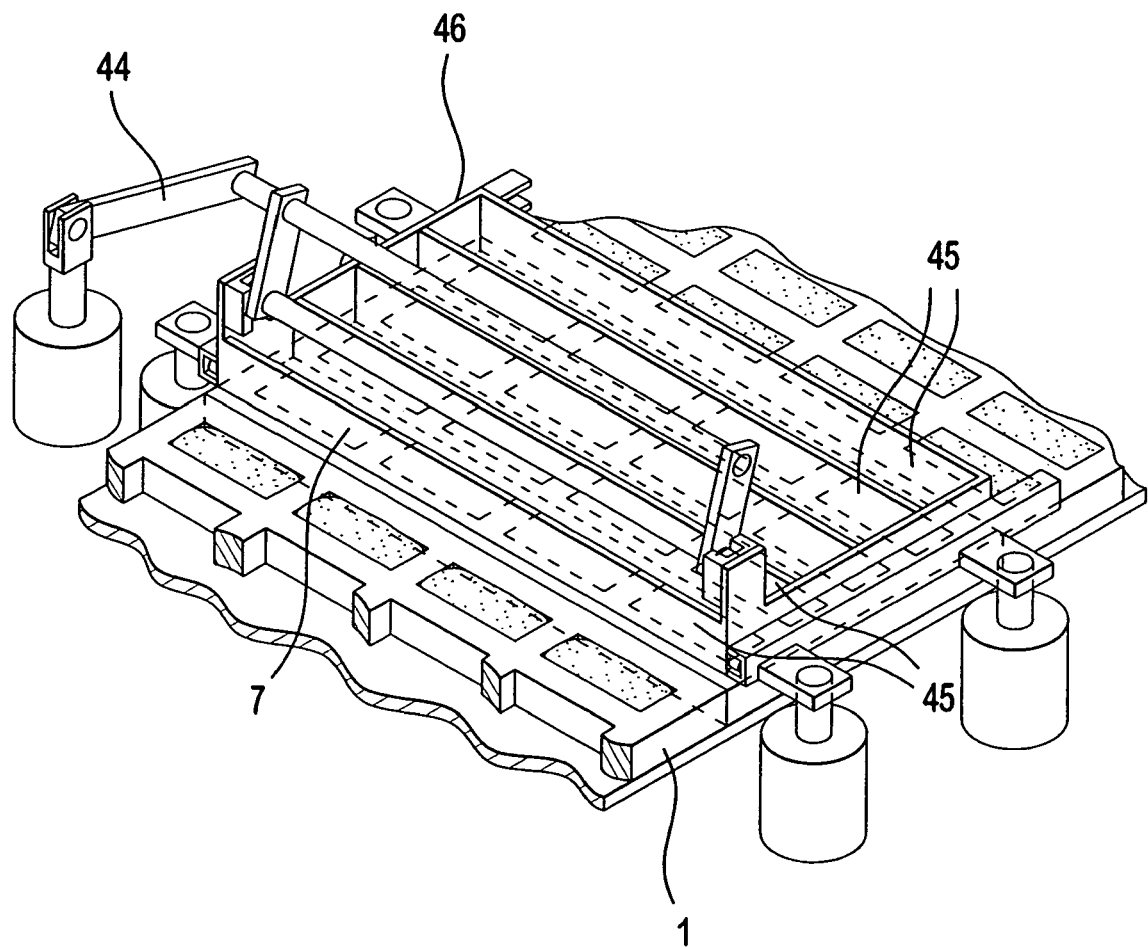
FIG. 4 is a schematic view of the dough mixture being leveled.

As shown in FIG. 4, the leveling device 7 includes a support member 46 having a plurality of parallel bars 45. The bars 45 are spaced such that each of the bars 45 corresponds to a row of cavities 5 in the die 1. Each of the bars 45 has a scraper (not shown) extending toward the die 1 from a bottom surface thereof. The leveling device 7 has an electronic sensor (not shown), such as a photo eye, for activating a driving mechanism 44 that drives the leveling device 7. The driving mechanism 44 may be any conventional driving means that is capable of driving the leveling device 7 perpendicular and parallel to the top surface 3 of the die 1. Alternatively, the leveling device 7 may be any known leveling device that is capable of leveling the dough mixture 9 and/or removing any excess of the dough mixture 9 from the die 1.

Figure 5:
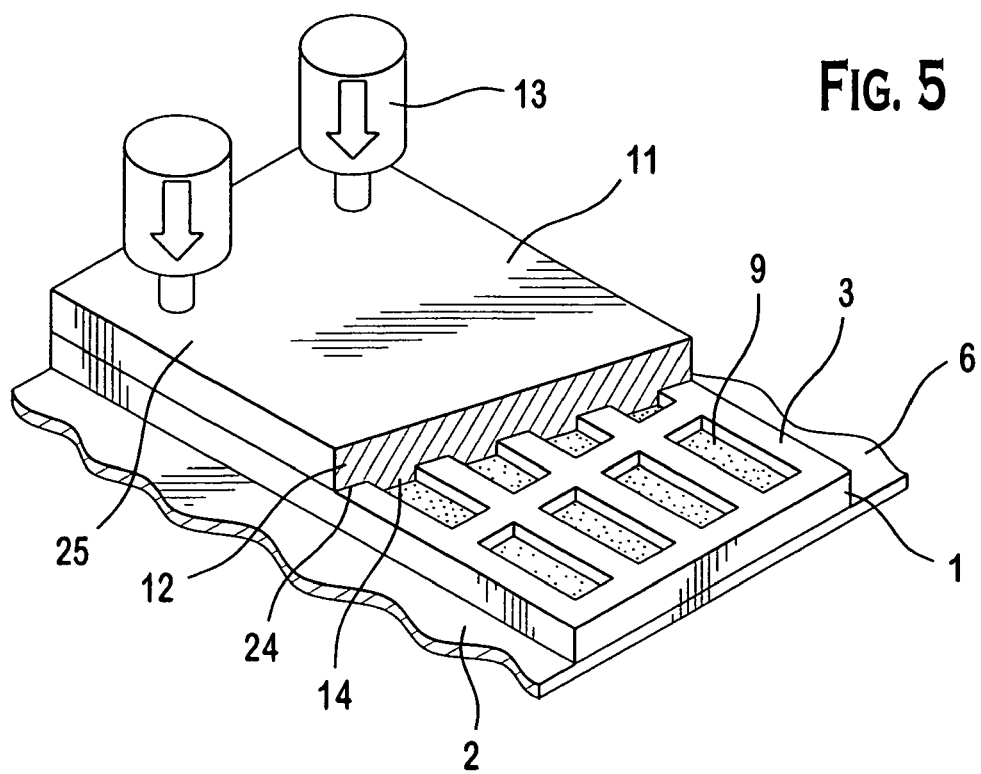
FIG. 5 is a schematic view of the dough mixture being compressed.

As shown in FIG. 5, the compression device 11 consists of a substantially plate-like press 12 and a press driving mechanism 13. The press 12 has projections 14 extending from a first surface 24 thereof. Each of the projections 14 corresponds to one of the cavities 5 of the die 1 and is capable of being received therein. The press driving mechanism 13 is connected to a second surface 25 of the press 12. The press driving mechanism 13 may be any conventional driving means that is capable of driving the press 12 such that the projections 14 move into and out of the cavities 5 to apply a desired pressure to the dough mixture 9 contained therein. For example, a standard range of pressure would be between 5 psi and 100 psi.

Figure 6:
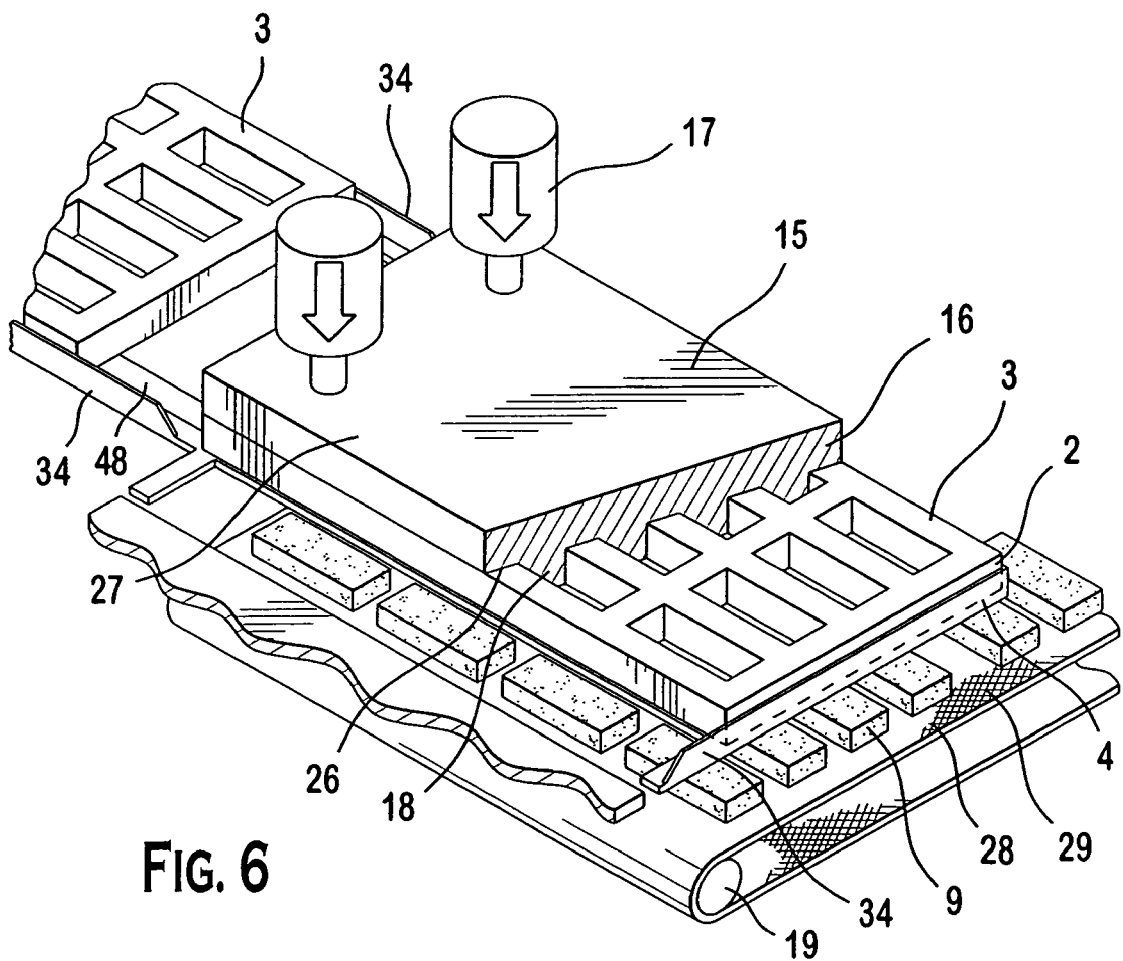
FIG. 6 is a schematic view of the compressed dough mixture being ejected from the die.

As shown in FIG. 6, the ejection mechanism 15 consists of a substantially plate-like driving plate 16 and a plate driving mechanism 17. The driving plate 16 has extensions 18 extending from a first surface 26 thereof. Each of the extensions 18 corresponds to one of the cavities 5 of the die 1 and is capable of being received therein. The plate driving mechanism 17 is connected to a second surface 27 of the driving plate 16. The plate driving mechanism 17 may be any conventional driving means that is capable of driving the driving plate 16 such that the extensions 18 move into and out of the cavities 5.

As shown in FIGS. 5 and 6, the conveyor 19 has a fabric apron 29 having a receiving surface 28. The conveyor 19 may be any known conveying device capable of conveying the dough mixture 9 after it has been removed from the die 1 through a remainder of the system 50.

As shown in FIG. 1, the railing system 34 forms a continuous path with the die backing plate 2 and has a moveable belt 48 that conveys the die along the railing system 34. As shown in FIG. 6, the railing system 34 is positioned adjacent to the die backing plate 2 and between the ejection mechanism 15 and the apron 29. The railing system 34 is arranged such that it receives the die 1 and holds the die 1 during removal of the dough mixture 9 from the cavities 5 by the ejection mechanism 15. Alternatively, the railing system 34 may be any known railing system capable of conveying the die 1.

Figure 7:
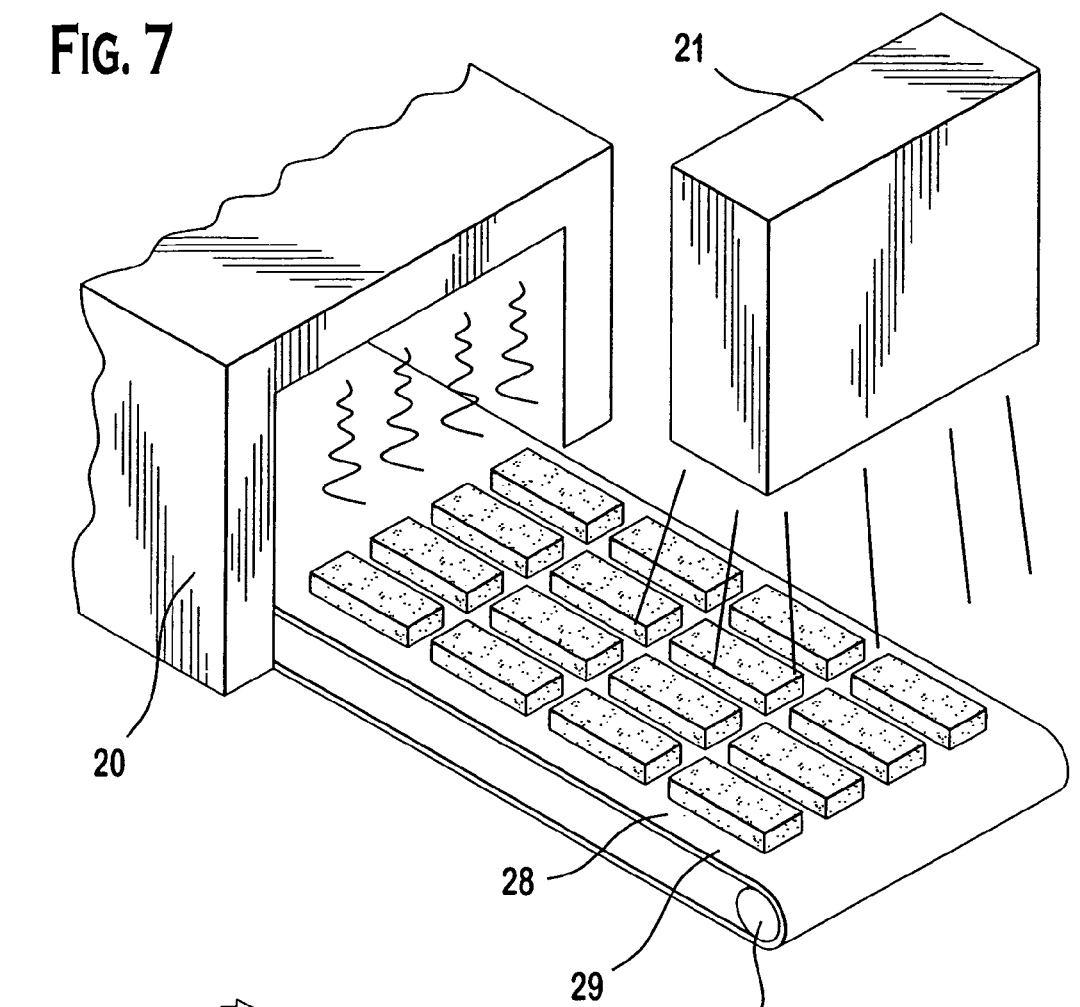
FIG. 7 is a schematic view of the compressed dough mixture being baked and cooled.

As shown in FIG. 7, the baking device 20 may be any known baking device capable of baking the dough mixture 9, such as an indirect fired oven, direct gas fired oven, or a "hybrid" oven that combines these technologies, to form the biscuit 22. For example, the baking device 20 may be such that a standard baking time would be between 10 minutes and 20 minutes at varying temperatures.

As shown in FIG. 7, the cooling device 21 may be any known cooling device capable of cooling the dough mixture 9 after it has been baked, such as an ambient air cooling tunnel conveyor, or a cooling tunnel conveyor with temperature controlled cooling air. For example, the cooling device 21 may be such that a standard cooling time may be between 15 minutes and 30 minutes.

Figure 8:
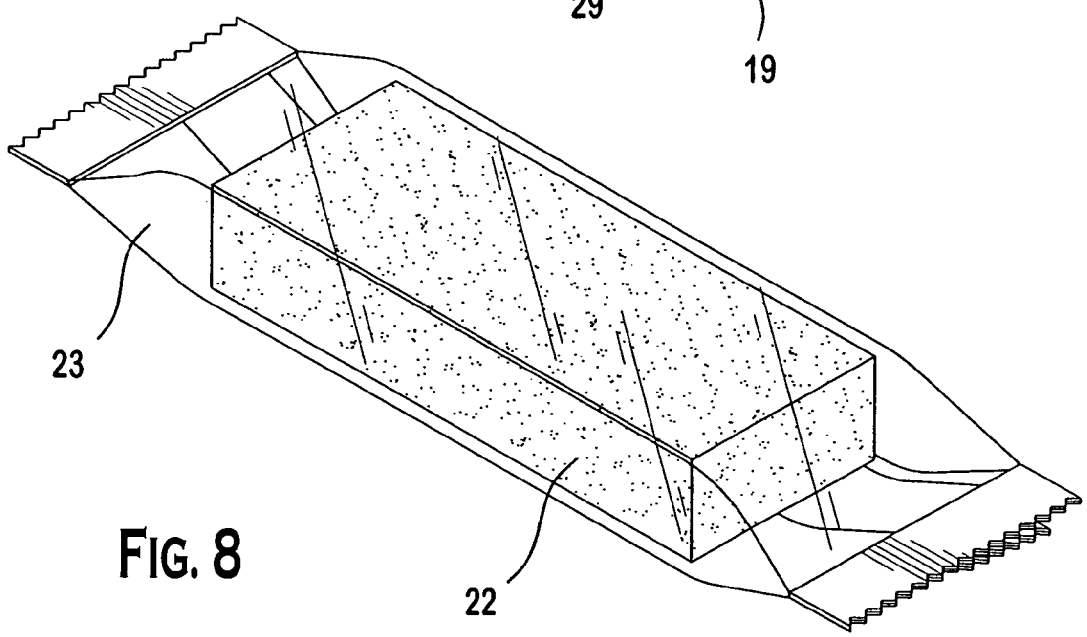
FIG. 8 is a pictorial illustration of a biscuit that has been packaged.

FIG. 8 shows the biscuit 22 after the biscuit 22 has been wrapped in a package 23 by a packaging device (not shown). The packaging device (not shown) may be any known packaging device capable of placing the desired package 23 on the biscuit 22.

The method for making the biscuits 22 with the system 50 will now be described in greater detail with reference to FIGS. 1 through 8. As shown in FIGS. 1 and 2, the die 1 is conveyed by the belt 48 on the railing system 34 onto the first end 40 of the die backing plate 2 such that the bottom surface 4 of the die 1 is positioned on the die receiving surface 6. The positioning mechanism 49 is driven toward the die 1 so that it engages the die 1 and advances the die 1 along the die backing plate 2 toward the agitator 10. As the die 1 is advanced, it simultaneously advances adjacent dies 3 on the die backing plate 2. The positioning mechanism 49 is retracted and then repeats this process. The die 1 is advanced until the top surface 3 of the die 1 is positioned adjacent to the bottom face 38 and underneath the grid 33 of the agitator 10, as shown in FIG. 3.

As shown in FIG. 3, the dough conveyor 8 conveys the dough mixture 9 toward the open side 50 of the hopper 49. As the dough mixture 9 is being conveyed, the helical screw 43 rotates to control the amount and distribution of the dough mixture 9 exiting the hopper 49 through the open face 50. The dough mixture 9 descends downward into an area formed by the side walls 30 and onto the grid 33. When the level sensor (not shown) of the agitator 10 senses that the amount of the dough mixture 9 in the agitator 10 is at a desired level, the level sensor (not shown) signals the electronic device (not shown) on the dispensing device 8. The electronic device (not shown) deactivates the dough conveyor 42 to stop the dough mixture 9 from being dispensed into the agitator 10.

The base 32 is agitated by the agitating mechanism 36 such that the grid 33 moves in a substantially circular motion in a plane parallel to the top surface 3 of the die 1 to distribute the dough mixture 9 though the through-holes 37 of the grid 33 and into the cavities 5 of the die 1. The grid 33 may be agitated such that it alternates between a clockwise motion and a counter-clockwise motion with every other die 1. The grid 33 thereby ensures that the dough mixture 9 is evenly distributed into the cavities 5 and has a uniform consistency. As the dough mixture 9 is being agitated, air is released from the dough mixture 9. It should be understood that if the agitator 10 is not agitated, the dough mixture 9 could still be distributed into the cavities 5 of the die 1 by simply falling through the through-holes 37 of the grid 33 and into the cavities 5. When the level sensor (not shown) senses that the amount of the dough mixture 9 in the agitator 10 is below a desired level, the level sensor (not shown) signals the electronic device (not shown) on the dispensing device 8. The electronic device (not shown) activates the dough conveyor 42 so that more of the dough mixture 9 is dispensed into the agitator 10.

When the cavities 5 are filled, the die 1 is conveyed by the positioning mechanism 49 toward the leveling device 7. The electronic sensor (not shown) senses when the die 1 is positioned underneath the support member 46. The electronic sensor (not shown) activates the driving mechanism 44 of the leveling device 7. The support member 46 moves downward toward the die 1 until the scrapers (not shown) contact the top surface 6 of the die 1. The support member 46 is then moved substantially parallel to the top surface 6 of the die 1 so that the scrapers (not shown) slide across the top surface 6 of the die 1 and the cavities 5 of their corresponding row. As the scrapers (not shown) slide across the top surface 6 of the die 1 and the cavities 5 of their corresponding row, the scrapers (not shown) level the dough mixture 9 and remove any excess dough mixture 9 from the die 1. The support member 46 is then moved upward away from the die 1 and returned to its starting position. This process may be repeated until all of the excess dough mixture 9 is removed from the die 1. The excess dough mixture 9 may be dispensed into a container (not shown) for later recycling.

The die 1 is conveyed by the positioning mechanism 49 toward the compression device 11. As shown in FIG. 5, the top surface 3 of the die 1 is positioned adjacent to the press 12 such that the projections 14 correspond to the cavities 5. The second surface 24 of the press 12 is driven toward the top surface 3 by the press driving mechanism 13 such that the projections 14 enter the cavities 5 and compress the dough mixture 9 against the die receiving surface 6 of the die backing plate 2. During compression, the dough mixture 9 is evenly distributed in the cavities 5 and the loose ingredients of the dough mixture 9 are pressed together. The press driving mechanism 13 then drives the press 12 away from the top surface 3 of the die 1 so that the projections 14 exit the cavities 5.

The die 1 is conveyed toward the ejection mechanism 15, as shown in FIG. 6. As the die 1 is conveyed toward the ejection mechanism 15, the die 1 moves from the second end 41 of the die backing plate 2 onto the railing system 34. Once on the railing system 34, the die 1 is positioned between the apron 29 and the ejection mechanism 15. The top surface 3 of the die 1 is positioned adjacent to the driving plate 16 such that the extensions 18 correspond to the cavities 5. The second surface 26 of the driving plate 16 is driven toward the top surface 3 by the plate driving mechanism 17 such that the extensions 18 enter the cavities 5 and push the compressed dough mixture 9 out of the cavities 5 through the bottom surface 4 of the die 1 and onto the receiving surface 28 of the apron 29. The plate driving mechanism 17 then drives the driving plate 16 away from the top surface 3 of the die 1 so that the extensions 18 exit the cavities 5.

As shown in FIG. 1, the die 1 is conveyed back toward the first end 40 of the die backing plate 2 by the belt 48 of the railing system 34, as the compressed dough mixture 9 is conveyed by the conveyor 19 toward the baking device 20. As shown in FIG. 7, the conveyor 19 conveys the dough mixture 9 through the baking device 20. The dough mixture 9 is baked at varying temperatures for between 10 and 20 minutes to form the biscuit 22. The biscuit 22 is then conveyed by the conveyor 19 though the cooling device 21. The cooling device cools the biscuits 22 for between 15 and 30 minutes. The biscuit 22 is then conveyed to the packaging device (not shown) by the conveyor 19. The packaging device (not shown) applies the package 23 to the biscuit 22 so that the biscuit 22 is ready to be shipped, as shown in FIG. 8.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A method for making biscuits, comprising:
    positioning a grid of an agitator using a railing system in a position substantially above a die;
    dispensing a dough mixture onto the grid of the agitator with the dispensing device;
    agitating the grid to dispense the dough mixture through through-holes in the grid into cavities of the die; and
    compressing the dough mixture in the cavities of the die with a compression device.

2. The method of claim 1, further comprising ejecting the dough mixture from the cavities of the die by pushing the dough mixture from a top surface of the die out of a bottom surface of the die.

3. The method of claim 2, wherein the ejection mechanism includes a driving plate with a plurality of extensions that are received in the cavities to eject the dough mixture.

4. The method of claim 1, further comprising leveling the dough mixture and removing excess of the dough mixture from the die with a leveling device.

5. The method of claim 1, further comprising baking the dough mixture.

6. The method of claim 5, further comprising cooling the dough mixture.

7. The method of claim 1, wherein the dough mixture is a moist loose mix of ingredients.

8. The method of claim 7, wherein the dough mixture is uncooked.

9. The method of claim 7, wherein the dough mixture is cooked.

10. The method of claim 1, wherein the dough mixture is compressed at between 5 psi and 100 psi.

11. The method of claim 1, wherein the grid is agitated for approximately 10 seconds or less.

12. The method of claim 1, wherein the compression device includes a press having projections that are received in the cavities to compress the dough mixture.

13. The method of claim 1, wherein the dough mixture is compressed against a removable die backing plate positioned adjacent to a bottom surface of the die.

14. The method of claim 1, wherein the dispensing device includes a hopper with an open end having a helical screw, the dough mixture being conveyed toward the open end by a dough conveyor.

15. The method of claim 1, wherein a plurality of side walls enclose the grid to contain the dough mixture.

16. The method of claim 1, wherein the grid moves in a substantially circular motion in a plane parallel to a top surface of the die.

17. The method of claim 16, wherein the grid is agitated such that it alternates between a clockwise and counter-clockwise direction.

18. The method of claim 1, wherein the die is an elongated plate.

19. A method for making biscuits, comprising:
 positioning a grid of an agitator using a railing system in a position substantially above a die;
 dispensing a dough mixture into the agitator;
 agitating the dough mixture as the dough mixture is being dispensed into cavities of the die;
 compressing the dough mixture in the cavities of the die with a compression device; and
 ejecting the dough mixture from the cavities of the die by pushing the dough mixture from a top surface of the die out of a bottom surface of the die and onto an apron with an ejection mechanism.

20. The method of claim 19, further comprising leveling the dough mixture and removing excess of the dough mixture from the die with a leveling device.

21. The method of claim 19, further comprising baking the dough mixture.

22. The method of claim 19, wherein the dough mixture is a moist loose mix of ingredients.

23. The method of claim 22, wherein the dough mixture is uncooked.

24. The method of claim 22, wherein the dough mixture is cooked.

25. The method of claim 19, wherein the dough mixture is compressed at between 5 psi and 100 psi.

26. The method of claim 19, wherein the dough mixture is agitated for approximately 10 seconds or less.

27. The method of claim 19, wherein the compression device includes a press having projections that are received in the cavities to compress the dough mixture.

28. The method of claim 19, wherein the ejection mechanism includes a driving plate with a plurality of extensions that are received in the cavities to eject the dough mixture.

29. The method of claim 19, wherein the dough mixture is compressed against a removable die backing plate positioned adjacent to the bottom surface of the die.

30. The method of claim 19, wherein the dispensing device includes a hopper with an open end having a helical screw, the dough mixture being conveyed toward the open end by a dough conveyor.

31. The method of claim 19, wherein the agitator has a plurality of side walls for containing the dough mixture.

32. The method of claim 19, wherein the agitator moves in a substantially circular motion in a plane parallel to a top surface of the die.

33. The method of claim 19, wherein the die is an elongated plate.

34. A method for making biscuits, comprising:
 positioning a grid of an agitator using a railing system to a position substantially above a die;
 dispensing a dough mixture through a grid and into cavities of the die;
 compressing the dough mixture in the cavities of the die with a compression device; and
 ejecting the dough mixture from the cavities of the die by pushing the dough mixture from a top surface of the die out of a bottom surface of the die.

35. The method of claim 34, wherein the ejection mechanism includes a driving plate with a plurality of extensions that are received in the cavities to eject the dough mixture.

36. The method of claim 34, leveling the dough mixture and removing excess of the dough mixture from the die with a leveling device.

37. The method of claim 34, further comprising baking the dough mixture.

38. The method of claim 34, wherein the dough mixture is a moist loose mix of ingredients.

39. The method of claim 34, wherein the dough mixture is compressed at between 5 psi and 100 psi.

40. The method of claim 34, wherein the compression device includes a press having projections that are received in the cavities to compress the dough mixture.

41. The method of claim 34, wherein the dough mixture is compressed against a removable die backing plate positioned adjacent to a bottom surface of the die.

42. The method of claim 34, wherein the die is an elongated plate.

* * * * *